United States Patent
Wilhelm Rekow et al.

(10) Patent No.: US 6,732,024 B2
(45) Date of Patent: May 4, 2004

(54) METHOD AND APPARATUS FOR VEHICLE CONTROL, NAVIGATION AND POSITIONING

(75) Inventors: Andrew Karl Wilhelm Rekow, Waterloo, IA (US); David Mark Bevly, Robstown, TX (US); Bradford W. Parkinson, Los Altos, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 95 days.

(21) Appl. No.: 09/850,288

(22) Filed: May 7, 2001

(65) Prior Publication Data

US 2002/0165649 A1 Nov. 7, 2002

(51) Int. Cl.[7] .......................... G05D 1/00; G01C 22/00
(52) U.S. Cl. ............................ 701/26; 701/200; 701/96; 340/901; 73/178 R
(58) Field of Search .............................. 701/26, 96, 200, 701/209, 210, 201; 73/178 R; 340/901, 903

(56) References Cited

U.S. PATENT DOCUMENTS

| | | | | |
|---|---|---|---|---|
| 5,852,791 A | * | 12/1998 | Sato et al. .................. 701/217 |
| 6,011,508 A | * | 1/2000 | Perreault et al. ............ 342/350 |
| 6,052,647 A | | 4/2000 | Parkinson et al. | |
| 6,128,559 A | * | 10/2000 | Saitou et al. ................. 701/23 |
| 6,148,255 A | | 11/2000 | van der Lely | |
| 6,163,750 A | * | 12/2000 | Nojima ....................... 701/209 |
| 6,169,940 B1 | * | 1/2001 | Jitsukata et al. .............. 701/23 |
| 6,216,071 B1 | | 4/2001 | Motz | |
| 6,246,932 B1 | * | 6/2001 | Kageyama et al. ........... 701/24 |
| 6,272,405 B1 | * | 8/2001 | Kubota ......................... 701/23 |
| 6,311,119 B2 | * | 10/2001 | Sawamoto et al. ........... 701/96 |
| 6,313,758 B1 | * | 11/2001 | Kobayashi .................. 340/932 |

OTHER PUBLICATIONS

Elkaim, G. et al., "System Identification of a Farm Vehicles Using Carrier–Phase Differential GPS", Presented ION Conference, Kansas City, MO, Sep. 1996, 10 pp.

O'Connor, M. et al., "Automatic Steering of Farm Vehicles Using GPS", Presented 3$^{rd}$ International Conference on Precision Agriculture, Minneapolis, MN, Jun. 1996, 10 pp.

* cited by examiner

Primary Examiner—William A Cuchlinski, Jr.
Assistant Examiner—Olga Hernandez
(74) Attorney, Agent, or Firm—Dorsey & Whitney LLP

(57) ABSTRACT

The present invention provides for a method and apparatus for providing navigation and positioning for at least one or more slave vehicles, wherein the slave vehicles provide their own navigation based on a location of a master vehicle. The method and apparatus allow a slave vehicle to receive a location of a master vehicle and a location of the slave vehicle. Once the location of the vehicles are known, the slave vehicle determines a desired position based on the master vehicle location, determines if adjustments are needed to position the first slave vehicle at the desired position and implements the adjustments if adjustments are needed. The slave vehicle is capable of operating in one of a plurality of modes and further is capable of transitioning from a first mode of operation to a second mode of operation in optimizing navigation and control.

53 Claims, 11 Drawing Sheets

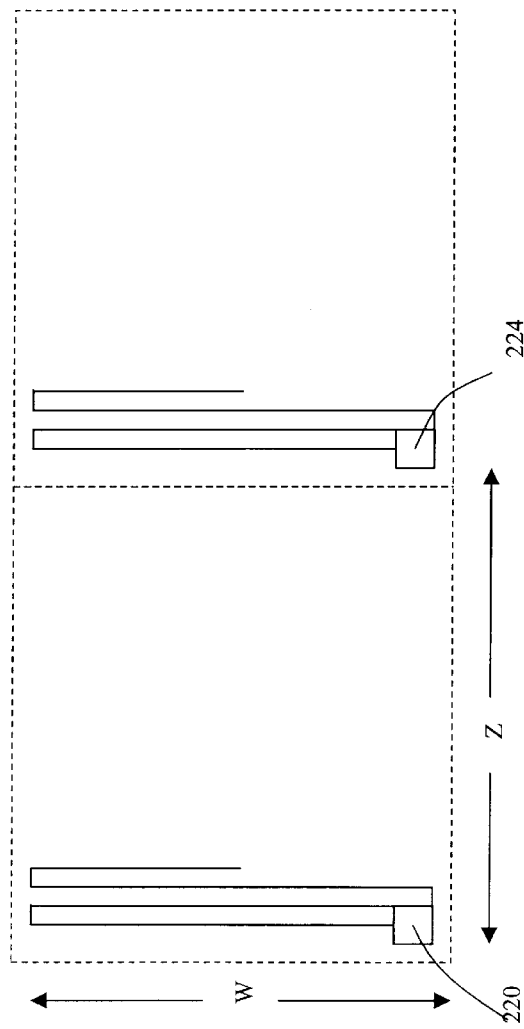
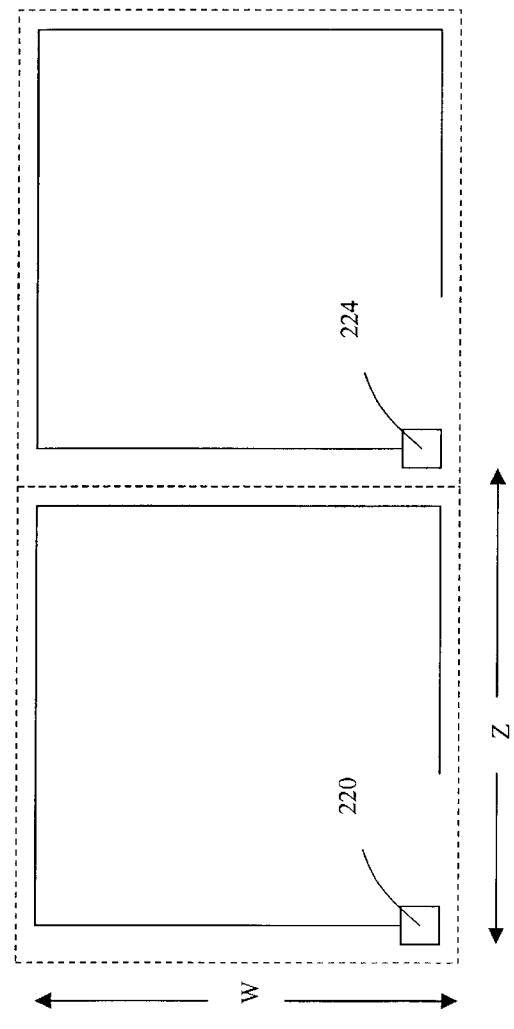

METHOD AND APPARATUS FOR VEHICLE CONTROL, NAVIGATION AND POSITIONING

FIELD OF THE INVENTION

The present invention relates generally to the controlling and positioning of vehicles, and more particularly to the controlling and positioning of vehicles based on relative positioning of a master vehicle.

BACKGROUND

Determining the position of an individual or vehicle is well known in the art. Global Positioning Satellites (GPS) systems, Carrier Phase Differential GPS (CDGPS) and other positioning systems provide accurate positioning for a car, a truck, an agricultural vehicle, an aircraft and other types of vehicles. Control systems have been developed to accurately determine the location of a vehicle and to aid in providing directional control for that vehicle based on the determined location (see for example, U.S. Pat. No. 6,052,647, Parkinson et al.). However, this control system is limited to the control of a single vehicle. Further, this system requires the vehicle to be given a predefined path to follow. This predefined path requires the operator to determine the size of the area the vehicle is suppose to travel upon, determine what needs to be performed, and precisely determine how to implement and control the vehicle prior to activating the vehicle. This is time consuming and requires detailed measurements prior to activation. Further, it limits the implementation of performing the desired task to the specific predefined path and is susceptible to errors in entering the path as well as following a path based on potentially inaccurate measurements.

Another vehicle control system for agricultural vehicles provides for a master vehicle to determine the location of itself as well as a slave vehicle and to provide control for the slave (see U.S. Pat. No. 6,148,255, van der Lely). The slave vehicle is controlled by a control system from the master vehicle, where the control is being provided radiographically or by cable. The slave vehicle further requires video cameras arranged to allow the controller of the master vehicle to view both the forward and the rear views from the slave vehicles. The operation of this system requires visibility and thus limits implementation.

Further, the control limits the operation the slave vehicle to a position directly behind and in line with the master vehicle, or directly adjacent to and parallel with the master vehicle. The master vehicle can only control the slave vehicle along a single pass across a field. The master vehicle is unable to control the slave vehicle in turns or re-align the slave vehicle on a new path or pass. The turning and re-aligning must be performed manually. Still further, the control of the slave vehicle is performed by the master vehicle. Therefore, the master vehicle is burdened with the control and as such, the number of slave vehicles to be operated is severely limited due to the amount of computational requirements placed on the master vehicle in attempting to control the slave vehicles.

SUMMARY

The present invention provides for a method and apparatus for providing navigation and positioning for at least one or more slave vehicles, wherein the slave vehicles provide their own navigation based on a location of a master vehicle. In one embodiment, the present invention is implemented through a computer readable medium operating on one or more processors. The method and apparatus allow a slave vehicle to receive a location of a master vehicle and a location of the slave vehicle. Once the location of the vehicles are known, the slave vehicle determines a desired position for the slave vehicle based on the master vehicle location. The slave vehicle determines if adjustments are needed to position the first slave vehicle at the desired position and implements the adjustments if adjustments are needed. The slave vehicle is further capable of operating in one of a plurality of modes and further is capable of transitioning from one mode of operation to a second mode of operation in optimizing navigation and control.

In one embodiment, the slave vehicle determines the desired position by determining a first destination point relative to the location of the master vehicle. The slave vehicle is then capable of determining a first optimal course needed to position the first slave vehicle at the first destination point and to determine the adjustments to implement the first optimal course. In one embodiment, the slave vehicle determines a pseudo destination point based on the location of the master vehicle, and while determining the optimal course, the slave vehicle utilizes the first pseudo destination point in determining at least lateral adjustments. The navigational method and apparatus is further configured to allow the slave vehicle to determine the optimal course taking into account boundaries and obstacles.

In one embodiment, the slave vehicle determines the desired position by determining a first fixed point relative to the master vehicle location, and determines if adjustments are needed including determining if the first slave vehicle is located at the first fixed point. The slave vehicle determines the fixed point based on fixed point offset coordinates which are utilized in cooperation with the location of the master vehicle. In positioning itself, the slave vehicle determines a trajectory of the master vehicle, and a trajectory of the slave vehicle. The slave vehicle is then capable of determining if adjustments are needed including determining if the trajectory of the first slave vehicle is parallel with the trajectory of the master vehicle. In one embodiment, the trajectory is determined based in part on a heading of the slave vehicle.

In one embodiment, the slave vehicle provides navigation by receiving at least a first portion of a master vehicle path, and generating at least a first portion of a slave vehicle path based on the at least the first portion of the master vehicle path. Once at least a portion of the slave path is generated the slave vehicle determines if adjustments are needed in maintaining the slave vehicle on the slave vehicle path, and implements the adjustments if adjustments are needed. In generating at least the first portion of the first slave vehicle path, the slave vehicle generates at least the first portion of the first slave vehicle path by offsetting at least the first portion of the master vehicle path by an offset. In determining if adjustments are needed, the slave vehicle compares the location of the first slave vehicle with the first slave vehicle path, and determines if the first slave vehicle is off of the first slave vehicle path. If the slave vehicle is off the slave vehicle path the slave vehicle determines a trajectory to return the first slave vehicle to the first slave vehicle path. In one embodiment, the slave vehicle determines what steering adjustments are needed to make turns to follow the first slave path, and calculates the distance between the location of the first slave vehicle and approaching adjustments to a current trajectory of the first slave vehicle to continue on the first slave vehicle path.

As introduced above, the present method and apparatus is capable of providing navigation and control for a plurality of slave vehicles. Each slave vehicle provides its own navigation and control. Each slave vehicle utilizes the master vehicle location in determining its desired location. In one embodiment, the master vehicle can be defined as different vehicles for different slave vehicles. Such as, defining a first slave vehicle as the master vehicle for a second slave vehicle.

In one embodiment, the novel apparatus for providing vehicle navigation includes a communication controller configured to at least receive location information for at least a master vehicle and a slave vehicle, a location generator coupled with the communication controller, and configured to determine locations of at least the master vehicle relative to the position of the slave vehicle, and a desired location controller coupled with the location generator, and configured to determine a desired location of the slave vehicle relative to the location information of both the master vehicle and the slave vehicle. In one embodiment, the desired location controller is a trajectory controller configured control the trajectory of the slave vehicle, where the desired location controller includes a destination point calculator configured to determine a desired destination point relative to the master vehicle, and a course calculator coupled with the destination point calculator, and configured to determine an optimal course such that the slave vehicle acquires the desired destination point. In one embodiment, the desired location controller is a path controller configured to generate at least a slave vehicle path such that the slave vehicle follows the slave path.

BRIEF DESCRIPTION OF THE DRAWINGS

The invention will be understood from the following description when read in connection with the accompanying drawings in which:

FIGS. 8A–B shows a simplified graphical representations of implementations of the PT mode of operation;

DETAILED DESCRIPTION

Figure 1:
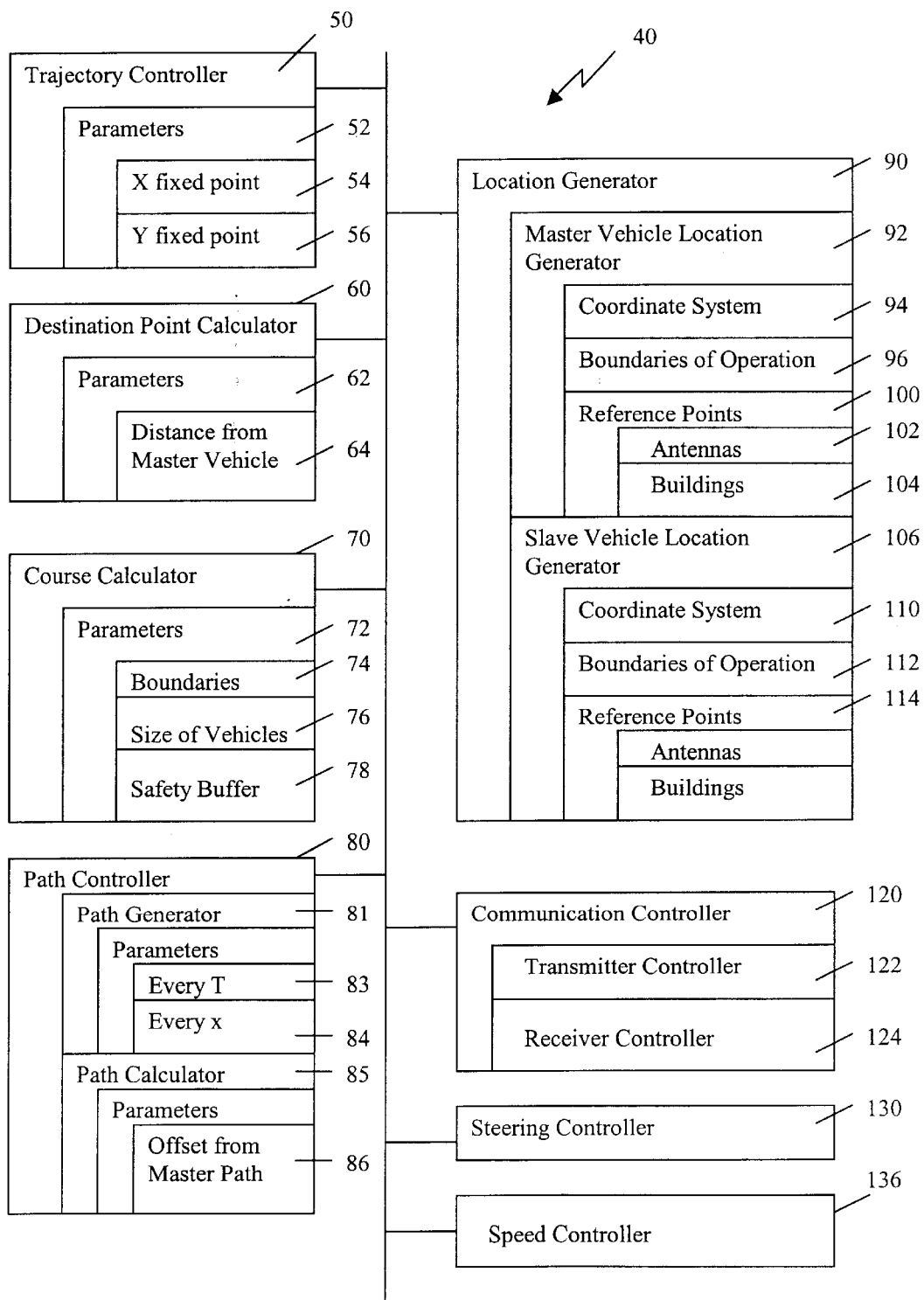
FIG. 1 depicts a simplified block diagram of one implementation of one embodiment of the novel distributed control and navigational apparatus or system.

The present inventive method and apparatus provides vehicle control for one or more vehicles. In one embodiment, the one or more vehicles include a master vehicle which sets control parameters. Once the parameters are provided, one or more slave vehicles provide their own control and are capable of utilizing the control parameters to determine their desired location, course, direction and speed. Thus, the method and apparatus utilizes a distributed control system where the slave vehicles determine their own course and trajectory. A plurality of vehicles can slave off of the master vehicle without further taxing the master vehicle. Each slave vehicle performs its own control. In one embodiment, the slave vehicle can also operate as a master vehicle to another second slave vehicle.

In one embodiment, the novel method and apparatus is implemented in agricultural vehicles. However, the control method and apparatus is equally applicable to substantially any vehicle or set of vehicles.

In one embodiment, the control system of the present invention utilizes a positioning system to determine the location of the one or more vehicles relative to one or more locations, boundaries, and/or to other vehicles. The positioning system implemented is substantially any positioning system including global positioning satellite (GPS) systems, Carrier Phase Differential GPS (CDGPS), code phase differential GPS, triangulation, Laser ranging, long range radio navigation (LORAN), inertial navigation systems, very high frequency omnidirectional ranging (VOR)/Tactical navigational system (TACAN), and substantially any other or combination of positioning and/or navigational systems known in the art. The positioning system is utilized to inform the one or more vehicles of their current position as well as the position of other vehicles. In one embodiment, positioning system provides each vehicle with the location of each of the other vehicles operating under the control and navigational system of the present invention. In one embodiment, a plurality of positioning systems are utilized, where the plurality of positioning systems communicate with each other to provide positioning information for the vehicles under any one of the positioning systems. In one embodiment, the control and navigational system of the present invention utilizes the control and positioning system as described in U.S. Pat. No. 6,052,647, Parkinson et al., entitled, METHOD AND SYSTEM FOR AUTOMATIC CONTROL OF VEHICLES BASED ON CARRIER PHASE DIFFERENTIAL GPS, incorporated in its entirety herein by reference, as one aspect of the control functions of the present system. In one embodiment, the slave vehicles are manned by an operator with override control to provide safety, reduce errors and emergency shutoff.

The control and positioning system of the novel method and apparatus utilizes the master vehicle to provide location parameters such that slave vehicles are capable of positioning themselves relative to the master vehicle. The slave vehicles utilize the parameters to at least determine appropriate steering and speed commands. The master vehicle is capable of being manually or automatically operated. When operating manually, a driver or vehicle operator determines the path or course of the master vehicle either by directly sitting at the controls of the vehicle or by remote control. When automatically operating, the master vehicle is programmed, given a predefined path in which to follow or is itself following another vehicle, and through the positioning and navigational system, the master vehicle automatically implements the path without additional intervention from an operator. In one embodiment, the slave vehicle's function is based on the parameters provided by the master vehicle regardless of whether the master vehicle is operated manually or automatically. In one embodiment, master and/or slave vehicles include displays which display the location of one or more of the vehicles. The display is further capable of showing the area being navigated, areas already navigated by previous vehicles, such as areas already harvested, boundaries, obstacles and other such information.

FIG. 1 depicts a simplified block diagram of one implementation of one embodiment of the novel distributed control and navigational apparatus or system 40 of the present invention. The system 40 includes a plurality of control components coupled together allowing communication between the control components.

In one embodiment, the system 40 includes a trajectory controller 50 which provides trajectory calculations, adjustments and control. The trajectory controller includes parameters 52 which are utilized in determining the desired trajectory. The parameters 52 include any number of parameters such as, an X fixed point and a Y fixed point from a give point such as the location of a master vehicle.

The system 40 includes a destination point calculator 60 which is configured to determine a desired destination point based on a given reference point. The destination point calculator 60 includes any number of parameters 62 such as a distance the destination point is to be from the reference point such as a master vehicle.

The system 40 includes a course calculator 70 which is configured to determine an optimal course from a starting or current position to the desired destination point determined by the destination point calculator 60. The course calculator 70 includes parameters 72 such as boundaries which must be avoided, or alternatively must be utilized, size of vehicles operating under the system 40, safety buffer zones around vehicles and other obstacles.

A path controller 80 is also included in the system 40 to generate a path or determine a path the vehicle is to follow and the control of the vehicle to maintain travel along the path. In one embodiment, the path controller 80 includes a path generator 81 which is configured to generate a master path based the location of the vehicle. The path generator 81 continuously or periodically generates the path utilizing parameters such as time parameters 83 and distance parameters 84. The path controller 80 further includes a path calculator 85 which is configured to utilizes a master path to generate a slave path based on predefined or calculated offset coordinates 86. Offset coordinates can be distances to the left, right, front and rear from a master vehicle or path, distances north, south, east and west of the master vehicle or path, and other such coordinates known in the art.

In one embodiment, the course and path controllers 70, 80, cooperate to implement a predefined or preprogrammed course. This allows the master and/or slave vehicles to implement a predefined course for automatic operation.

The system 40 further includes location generator 90 which, in one embodiment, is configured to determine location of any number of vehicles controlled by the system. The location generator 90 includes at least a master vehicle location generator 92 which utilizes subcontrollers and data such as coordinate systems 94, boundaries 96 limiting the operation of the vehicles, predefined reference points 100 such as antennas 102 of the positioning system, buildings 104 and other such reference points. In one embodiment, the location generator 90 further includes a slave vehicle location generator 106 which utilizes similar subcontrollers and data, i.e., coordinate systems 110, boundaries 112, and predefined reference points 114.

In one embodiment the system 40 further includes a communication controller 120 which allows the vehicle to communicate with the positioning system, navigational system, other vehicles, and such. The communication controller 120 includes a transmitter controller 122 and a receiver controller 124.

The system also includes a steering controller 130 which is utilized in trajectory, course and path implementation. The system further includes a speed controller 136 for controlling the speed of the vehicle.

The distributed vehicle control and navigational method and apparatus 40 provides for at least three modes of operation and distributed control. A first mode is referred to as a "destination point acquisition" (DPA) mode, a second is referred to as a "track and follow" (TAF) mode, and a third is referred to as a "path tracking" (PT) mode.

Figure 2:
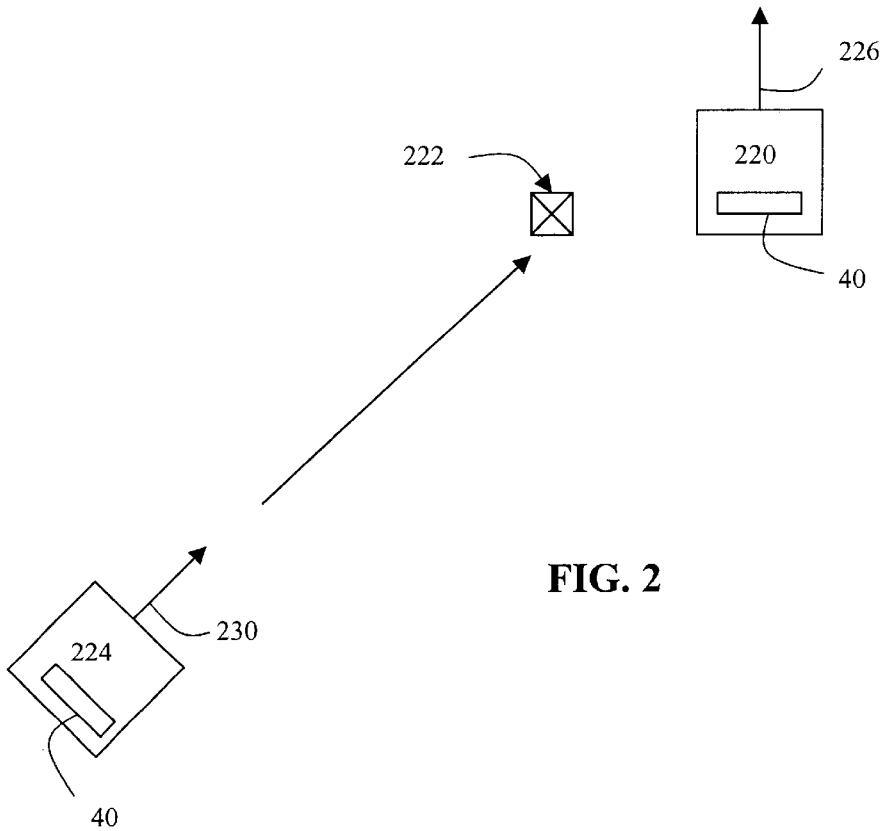
FIG. 2 depicts a simplified block diagram of one implementation of one embodiment of the destination point acquisition (DPA) mode of operation.

In the DPA mode, a slave vehicle determines its own direction, control and course to position itself at a desired destination point, where the destination point is dependent upon a location of a master vehicle. FIG. 2 depicts a simplified block diagram of one implementation of one embodiment of the DPA mode of operation. The slave vehicle 224 attempts to position itself at a desired location, such as a destination point 222, determined by destination point calculator 60, which is based on the location of the master vehicle 220. The slave vehicle is given coordinates or parameters 62 to allow the slave vehicle to determine the destination point based the location of the master vehicle 220. As an example, assume the master vehicle is a combine harvesting a crop and the slave vehicles is a grain cart for allowing the combine to unload the crop harvested by the combine. As such, the slave vehicle 224 sets a course, utilizing course calculator 70, to position itself relatively close to the master vehicle such that the crop can be unloaded from the master to the slave vehicle. Assuming it is desired that the slave vehicle 224 be three meters to the left of the master vehicle and one meter behind. The slave vehicle receives location information for the master vehicle 220 as well as its own location information, through the communication controller 120. The slave vehicle 224 determines the desired destination point 222 based on the parameters 62 defining the desired position relative to the master vehicle 220 (i.e., three meters to the left and 1 meter behind). The slave vehicle 224 then adjusts its current course, in one embodiment utilizing in part the steering and speed controllers 130, 136, respectively, based on its own location information and the trajectory needed to acquire the desired destination point 222, where trajectory is defined at least as an axis in the direction of travel of a vehicle extended from the vehicle to a fixed point or out to infinity. The parameters used to determine the desired destination point 222 can be based on distances (X meters to the left, and Y meters to the right of the master vehicle), time (10 seconds behind the master vehicle), a combination (X meters to the left and 10 seconds ahead) and other such parameters. The destination point 222 can be positioned at substantially any position relative to the master vehicle, whether, ahead, behind, left, right or combinations.

Further, in the DPA mode, the slave vehicle's course and/or axis of direction 230 is not limited to the master vehicle's course 226. Therefore, the slave vehicle 224 is capable of determining the shortest or optimal course to obtain the desired destination point 222, where course is defined at least as one or more of a series of trajectories over one or more series of distances traveled in attempting to acquire the destination point. The slave vehicle is not limited to the longitudinal or speed parameters of the master vehicle 220. The slave vehicle can approach the destination point 222 at substantially any desired speed and from substantially any initial location regardless of the position of the master vehicle. In one embodiment, the slave vehicle includes as a parameter the size of each of the vehicles 76 being controlled by the control system 40, including the master vehicle and its own size. With the size of the vehicles, the slave vehicle can control itself to ensure that it does not collide with other vehicles. In one embodiment, the slave vehicle is also given a buffer region 78 to further ensure there is no collisions and to account for inaccuracies of the positioning system.

Additionally, the slave vehicle 224 continuously or periodically recalculates its course 230 so that as the master vehicle 220 moves (i.e., continues to harvest), causing the desired destination point 222 to move, the slave vehicle adjusts its course and continues to attempt to acquire the destination point. In one embodiment, the slave vehicle utilizes the master vehicle's and it's own speed, past positioning, current positioning and direction of travel to determine a desired destination point 222 which "leads" the master vehicle. The slave vehicle 224 determines a course which will allow the slave vehicle to intersect the destination point without turning or with a limited number of turns (given the present speed differential, rate of closure, etc.) Thus the slave vehicle 224 anticipates where the destination point will be, such that the slave vehicle limits the amount of turns needed to acquire the destination point.

Figure 3:
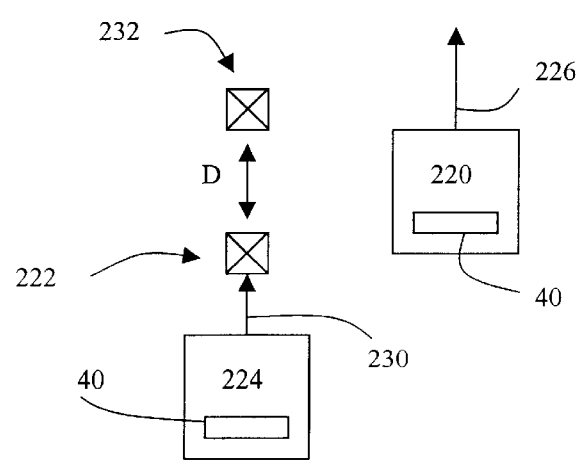
FIG. 3 shows a simplified block diagram of a further implementation of one embodiment of the DPA mode.

FIG. 3 shows a simplified block diagram of a further implementation of one embodiment of the DPA mode. In one embodiment, as the slave vehicle 224 attempts to acquire the destination point 222, the slave vehicle utilizes a second or pseudo destination point 232, determined at least in part through the destination point calculator 60. The pseudo destination point 232 is utilized by the slave vehicle for lateral or steering direction control, while the original destination point is used for longitudinal or speed control. The pseudo point is positioned a distance D along the course of direction 226 of the master vehicle 220. As the slave vehicle acquires or reaches the destination point 222, the slave vehicle continues to utilizes the pseudo point 232 for lateral control. This enables the slave vehicle to be less sensitive to small lateral errors. If the slave vehicle attempts to control steering based on a lateral error when the destination point 222 and the pseudo point 232 are right on top of each other, a small lateral motion may translate into a very large angular motion. Therefore, by providing a pseudo destination point 232 that is located a distance D ahead of the desired destination point 222 along the course of the master vehicle 226, or ahead of where the slave vehicle is currently located when positioned at the desired destination point 222, a dampening effect results which dampens out and makes the slave vehicles lateral control much less sensitive to small lateral errors which could translate into large heading errors.

Figure 4:
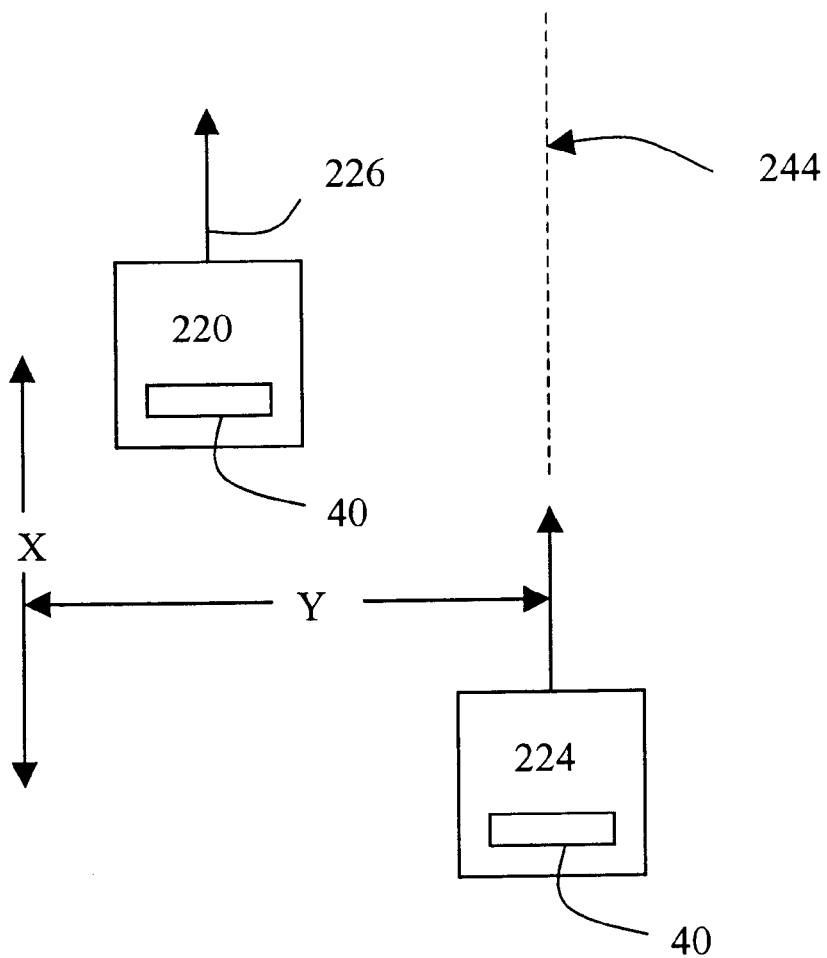
FIG. 4 depicts a simplified block diagram of one implementation of one embodiment of the track and follow (TAF) mode of operation.

In operating under the track and follow (TAF) mode the slave vehicle 224 maintains a fixed position relative to the position of the master vehicle 220. FIG. 4 depicts a simplified block diagram of one implementation of one embodiment of the TAF mode of operation. For example, the slave vehicle 224 maintains a desired position such as a fixed position which is X meters behind and Y meters to the right of the master vehicle 220, or T seconds behind the master vehicle. As the master vehicle adjusts its position or turns, the slave vehicle maintains a position which is X meters behind and Y meters to the right. In one embodiment, the slave vehicle 224 maintains the fixed position by matching headings with the master vehicle 220, wherein heading is defined at least as a direction toward which a vehicle is or potentially will be moving. The slave vehicle 224 controls its own forward and backward, as well as its left and right positioning based on the heading of the master vehicle 220. The slave vehicle receives master vehicle coordinate position information from the position system (i.e., CDGPS system) as well as master vehicle steering and speed adjustments and changes. Thus, the slave vehicle matches the master vehicle's heading so that the headings are substantially identical, with the slave vehicle 224 being maintained at the desired location X and Y distances from the master vehicle 220. In one embodiment, the trajectory controller 50 of the slave vehicle 224 utilizes the positioning, speed and steering of the master vehicle to determine a direction and plots a trajectory 244 from its current position out to infinity. The slave vehicle continuously or periodically monitors the parameters of the master vehicle 220 to re-calculate and adjust its trajectory 244. As such, the slave vehicle 224 maintains a parallel course 244 with the master vehicle course 242. During turns made by the master vehicle 220, the slave vehicle 224 maintains its fixed position relative to the master vehicle and continues on a parallel trajectory with the master vehicle. The TAF mode is equally applicable if the slave vehicle is to match the master vehicle and operate directly behind the master vehicle.

Figure 5A:
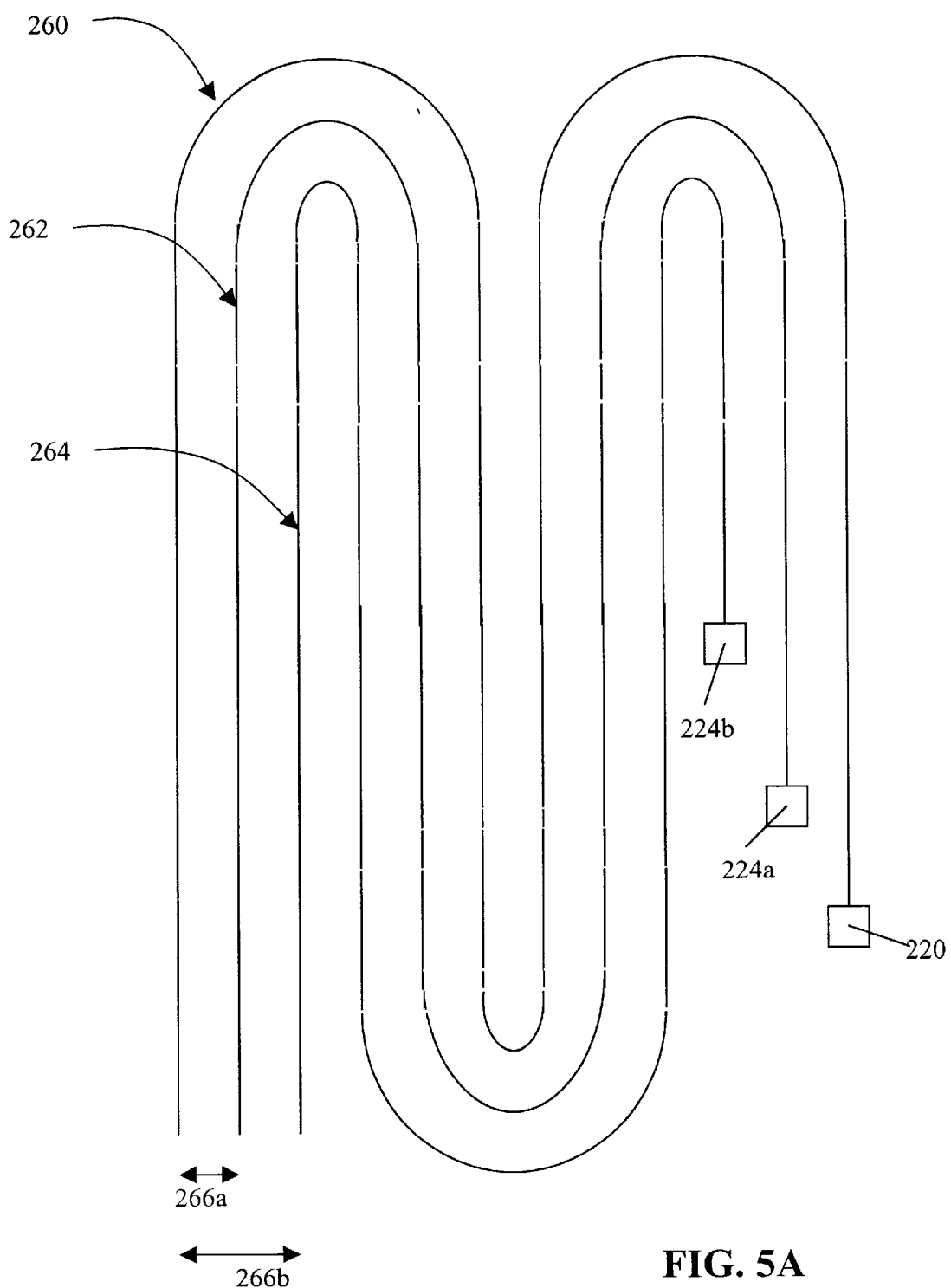
FIG. 5A depicts a simplified block diagram of one implementation of one embodiment of the path tracking (PT) mode.

FIG. 5A depicts a simplified block diagram of one implementation of one embodiment of the path tracking (PT) mode. In the PT mode, the master vehicle 220 initially proceeds to generate a first or master trail or path 260. The master path 260 is recorded through the path controller 80 based on the periodic position of the master vehicle 220 during the generation of the master path 260. In one embodiment, the master path is generated based on periodic time measurements, such that the location of the master vehicle 220 is recorded every T time intervals (such as every two seconds). In one embodiment, the master path 260 is generated on periodic distance measurements, such that the location of the master vehicle is recorded every predefined distance (such as ever two meters), or a combination of time and distance. Once the master path generation is initiated, one or more slave vehicles 224*a–b* are capable of generating or calculating one or more slave paths 262, 264 which are offset 266*a*, 266*b* from the master path 260. In the embodiment illustrated in FIG. 5A, the offset path is generated by projecting a predefined distance to either the right or left of the master vehicle. The slave vehicles then direct themselves based on the offset slave paths 262, 264, along with their own positioning information provided to the slave vehicles from the positioning system. In one embodiment, the path calculator 85 of the path controller 80 is utilized by the slave vehicle to aid in determining the slave path. In one embodiment, the slave vehicles maintain their desired positions along the slave path by comparing their current location with the slave path. If the slave vehicle is not on the slave path, the slave vehicle determines the optimal trajectory to return to the slave path. In one embodiment, the slave vehicle further anticipates turns, bends and adjustments that will need to be made by the slave vehicle to maintain the desired location along the path, by generating the slave path ahead of the current location and precalculating the adjustments which will be needed.

Figure 5B:
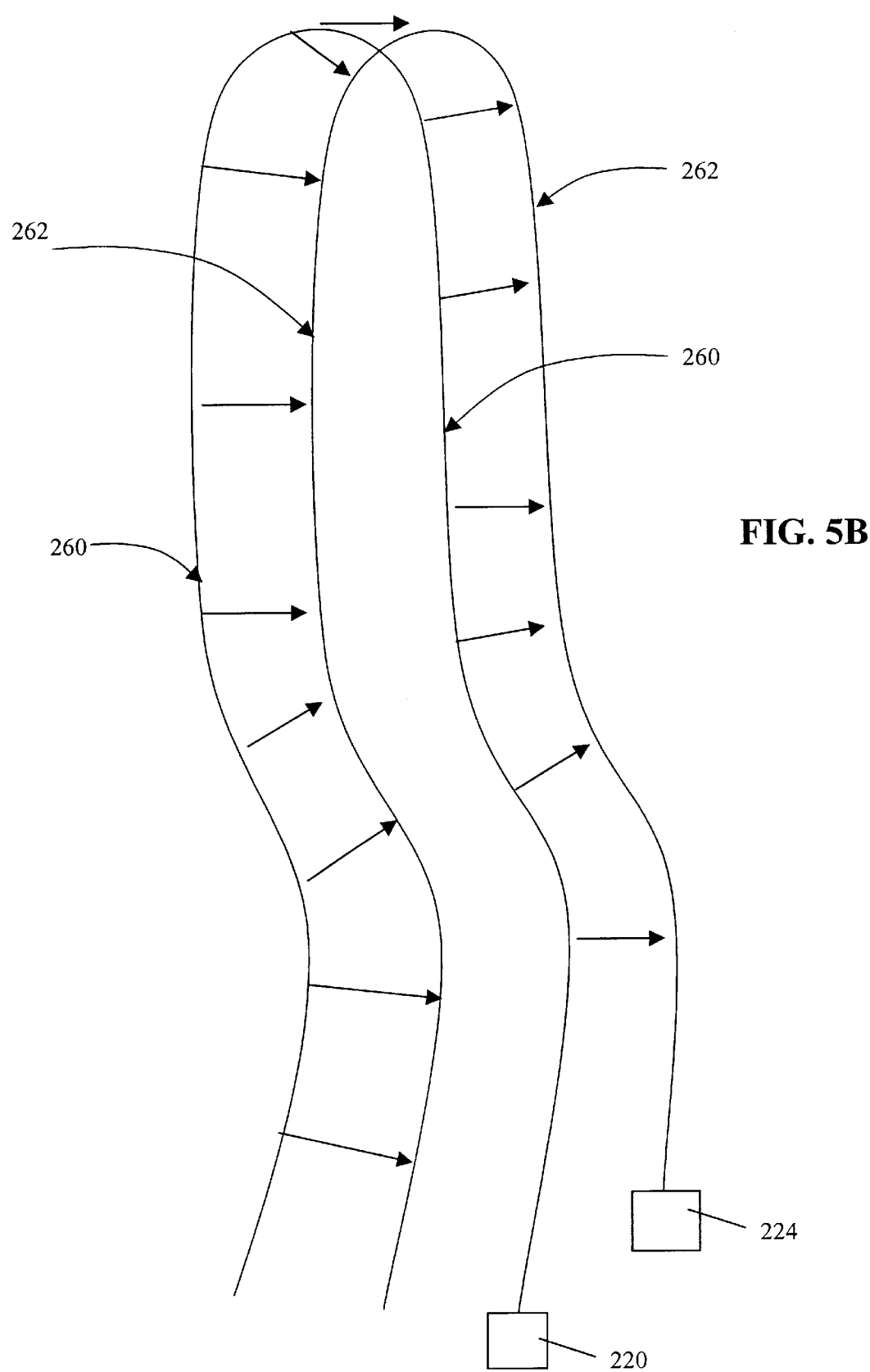
FIG. 5B depicts a simplified block diagram of one implementation of one embodiment of the PT mode.

FIG. 5B depicts a simplified block diagram of one implementation of one embodiment of the PT mode where the offset path 262 is generated by projecting out alternately from the right and left of the master path 260 depending on a general direction of the master vehicle 220. For example, if the master vehicle 220 desires to work a field from the west to the east, the projection for the slave vehicle path 262 would be to the right of and perpendicular to the master path 260 as the master vehicle 220 traveled generally north. On the next swath executed by the master machine heading generally south, the projection for the slave path 262 would be perpendicular and to the left of the master vehicle 220.

In one embodiment the slave vehicles are capable of generating the slave paths based on a point-to-point determination from the master path. The slave vehicles can generate a fitted curve to the points and follow the fitted curve.

In one embodiment, the slave vehicles 222 are capable of following the master path 260 at any time once the master vehicle 220 has initiated the generation of the master path 260. The slave vehicles are not restricted to operate on a completed master path. Once the master path is initiated and transmitted, the slave vehicles can receive the master path, determine the slave paths and proceed along the slave paths. In one embodiment, a complete master path 260 can be generated and stored. Then at any time later, slave vehicles are capable of utilizing the master path to dictate their slave path based on the offset provided to each slave path.

Further, if the slave vehicles are operated while the master vehicle is operating, the master and slave vehicles are not required to store the entire master path 260. In stead, the slave vehicles receive the information regarding the portion of the master path 260 most recently generated, generate the slave paths 262, 264 associated with the portion of the master path just received, and once the slave vehicles pass over a portion of the slave path, the slave vehicles can delete that portion of the master path and slave path already passed over. Thus, reducing the amount of memory capacity utilized and needed.

Figure 6:
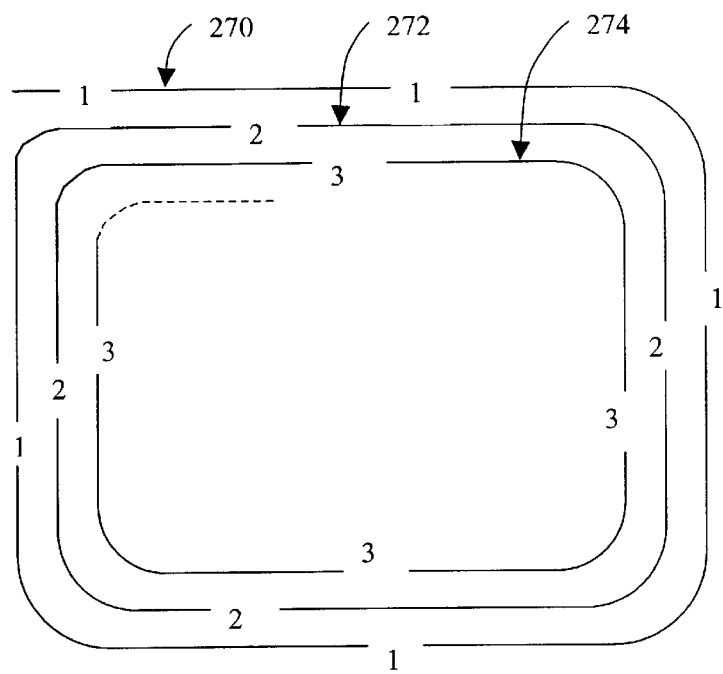
FIG. 6 shows a graphical representation of a potential master path and recursive slave paths.
Figure 7:
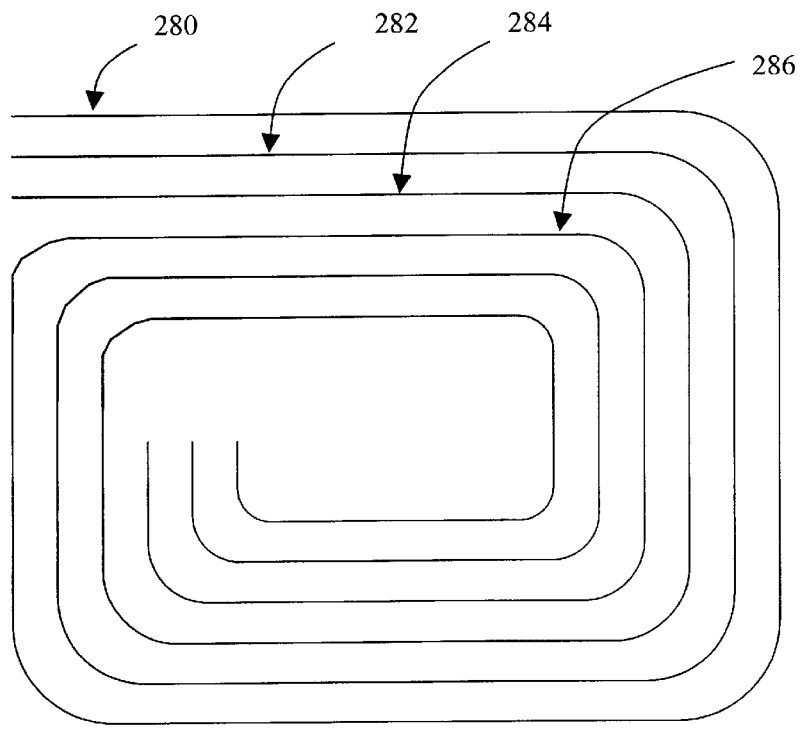
FIG. 7 shows a graphical representation where a master vehicle generates an initial master path, and a first and second slave vehicle generate a first and second slave path.

In one embodiment, the master vehicle 220 can slave off itself and off of its own initial master path. FIG. 6 shows a graphical representation of a potential master path 270 (indicated by "1"s). Once a master path is established, the master vehicle 220 is capable of becoming a slave of itself and offsetting a first slave path 272 (indicated by "2"s) from the master path 270. The master vehicle is then capable of generating a second slave path 274 (indicated by "3"s) by further offsetting or recursively offsetting from the master path 270. Alternatively, the master vehicle 220 is capable of offsetting off the first slave path 272. Thus, the first slave path becomes a master path to the second slave path 274. Additionally, one or more slave vehicles can be utilized in a similar fashion. FIG. 7 shows a graphical representation where a master vehicle generates an initial master path 280, and a first and second slave vehicle generate a first and second slave path 282, 284, respectively. Once the master path 280 is established, the master vehicle can then become a slave vehicle with a third slave path 286 offset from the second slave path 284, while the first and second slave vehicles continue to slave off the master vehicle as the master vehicle continues to slave off of the second slave path 284.

In one embodiment, the slave vehicle is configured to follow along the exact master path resulting in the slave path being substantially identical to the master path. Thus the slave vehicle utilizes the master path without offsetting. For example, if a master vehicle is cropping hay and initially generating a master path during cropping, then a slave vehicle can follow substantially the same master path as the slave path and pick up the bailed hay outputted by the master vehicle.

FIGS. 8A–B shows a simplified graphical representation of an implementation of the PT mode of operation. A slave vehicle 224 is positioned parallel to a master vehicle 220 but offset from the master vehicle by Z meters to the right. Thus, two equal portions of land can be processed at the same time. The master vehicle can initiate substantially any method for processing of the land and the slave vehicle will follow. In a first example, referring to FIG. 8A, the master vehicle initially travels a W distance forward, turns around and travels back a W distance shifted by the width of the master vehicle. The slave vehicle, in turn also proceeds forward a W distance, u-turns and proceeds back a W distance shifted over by the width of the vehicle. In a second example, referring to FIG. 8B, the master vehicle 220 will travel W distance forward, turn right and travel approximately Z meters, then turn right again and travel W distance before turning right again to head back towards the starting position. Similarly, the slave vehicle, positioned Z meters to the right of the master vehicle, will travel W distance forward, turn right and travel for Z meters, turn right and travel for W meters, and again turn right and head towards the starting point. Thus, two parcels of property (both Z×W meters$^2$) are processed at the same time.

The novel control and navigational method and apparatus of the present invention further allows the plurality of modes of operation to cooperate to allow greater flexibility in operation as well superior performance. Referring back to the example discussed above where a slave vehicle utilizes the DPA mode to acquire the desired destination point 222 to allow the combine to unload harvested crops. Once the slave vehicle reaches the destination point, the control mode can shift to an alternate mode of operation, such as the TAF mode of operation, where the slave vehicle will then maintain a fixed position relative to the location of the master vehicle and maintains a parallel trajectory. Thus the master vehicle can unload the crops collected while still in motion and still harvesting. Once the master vehicle unloads the crops collected, the slave vehicle can shift back to the DPA mode to return to a second destination point, such as a loading area where the slave vehicle can unload the crop, regardless of the location of the slave vehicle when switched to the DPA mode to return to unload. The switching can be initiated by the master vehicle, the slave vehicle, and an alternate computer. For example, the master vehicle can monitor the location of the slave vehicles and can signal the one or more slave vehicle to transition to an alternate mode of operation when the slave vehicle is within a predefined distance of a desired location, such as the desired destination point 222. In one embodiment, the master vehicle is programmed with a master plan or schedule, such that the master vehicle signals slave vehicles to initiate modes, or change modes. Alternatively, all the vehicles, master and slaves, are given the master plan, and each vehicle initiates the modes, functions or mode changes according to the master plan, and the locations of the vehicles. The master vehicle is capable of signaling one or more slave vehicles to cause them to shift to an alternate mode of operation while in motion or in operation. Alternatively, the slave vehicles can be signaled from an alternate computer (such as a control computer) to adjust their current mode of operation or adjust parameters used by the master and slave vehicles for positioning, course and trajectory determination.

In one embodiment, regardless of the mode, the slave vehicle includes as a parameter the size of each of the vehicles being controlled by the positioning system(s), including its own size and the size of the master vehicle. With the size of the vehicles known, the slave vehicle can control itself to ensure that it does not collide with other vehicles. The slave vehicle is also given a buffer region to further ensure there are no collisions, and to account for inaccuracies of the positioning system. In one embodiment, each vehicle is manned by an operator to ensure safety.

In one embodiment, the areas that the slave vehicles utilize for course routing can be restricted. For example, the slave vehicle in the DPA mode may be limited such that the slave vehicle will not cross predefined boundaries. As such, the slave vehicle will determine the optimal path to the destination point 222 while routing around the boundary areas. Boundary areas can include fences, unharvested crops, buildings, irrigation, another persons property, natural barriers such as rivers and hills, and substantially any other boundary. Alternatively, the slave vehicle can be routed to utilizes predefined boundaries such that the slave vehicles course is limited to within boundaries, such as roads or bridges.

In one embodiment, the control and navigation system 40 of the present invention utilizes a plurality of computers, processors, or microprocessors to receive the location, heading, speed, trajectory and other parameters. The system 40 utilizes these parameters to provide vehicle control. The control system is implemented through substantially any control scheme such as classical, fuzzy and other such control schemes. In one embodiment, for substantially any state the vehicle is in during operation, an appropriate steering angle and speed command is mathematically generated by the control system. The system utilizes control modules of the vehicle to direct the control modules to implement the control strategy determined by the system 40. The control modules of the master and slave vehicles are substantially any control modules which initiate adjustments for left and right control, such as electro-hydraulic steering-by-wire module or interface, and speed control, such as emulating the foot throttle and gear selection through an electronic transmission.

Figure 9:
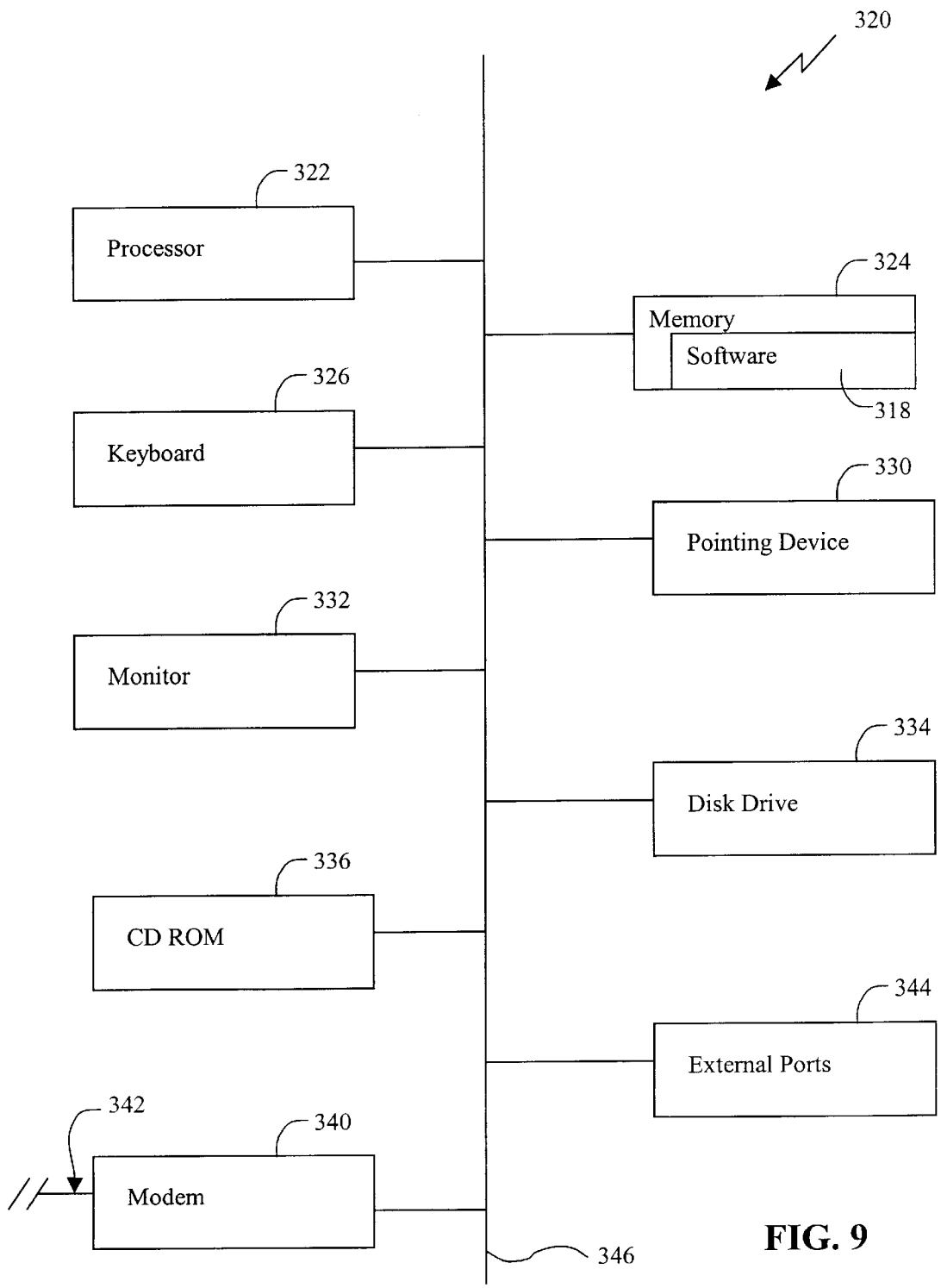
FIG. 9 is a high level block diagram depicting a computer used in connection with the present invention.

In one embodiment, the method and system of the present invention is implemented in a computer readable medium, such as a computer program or software 318 and executed on a computer 320 as illustrated in the high level block diagram of FIG. 9. As shown, computer 320 incorporates a processor 322 utilizing, in one embodiment, a central processing unit (CPU) and supporting integrated circuitry. A memory 324 which is any type or combination of memory including fast semiconductor memory (e.g., RAM, NVRAM or ROM), slower magnetic memory (e.g., hard disk storage), optical memory and any conventional memory known in the art, to facilitate storage of the computer program 318 and the operating system software. In one embodiment, also included in computer 320 are interface devices including, but not limited to, keyboard 326, pointing device 330, and monitor 332, which allow a user to interact with computer 320. Mass storage devices such as disk drive 334 and CD ROM 336 may also be included in computer 320 to provide storage of information. Computer 320 may communicate with other computers and/or networks via wired and wireless modem 340 and communication lines 342 to allow for remote operation, receiving and transmitting information or to utilize files stored on different computers. External ports 344 are also included to allow computer 320 to provide the vehicles with control signals. The external ports 344 provide communication between computer and control modules or units within the vehicles, such as speed module, steering module, and other such modules. In one embodiment, the components described above may be operatively connected by a communications bus 346. In one embodiment, the components may be operatively connected by wireless communication. In one embodiment, the method and system 40 are implemented on a processor 322 with accompanying memory 324 with external ports 344 for coupled with control modules.

In one embodiment, each vehicle being controlled by the system includes at least one computer. The computers determine the adjustments to be made in the individual vehicle location, heading, speed and other parameters. Each computer includes one or more software components or modules which provide for the control determinations. The computers signal the appropriate components of the vehicle to implement the changes. For example, the computer signals a speed controller 136 to adjust the speed of the vehicle, and the computer signals a steering controller 130 which adjusts the steering of the vehicle. In one embodiment, computers external to the vehicles perform part or all of the parameter and adjustment calculations and determinations. The external computers then signal the vehicles, such that the vehicle computers receive the adjustments and implement the adjustments. The external computers signal the vehicles through wireless communication, such as radio, cellular, bluetooth and substantially any other wireless communication known in the art.

Figures 10A, 10B:
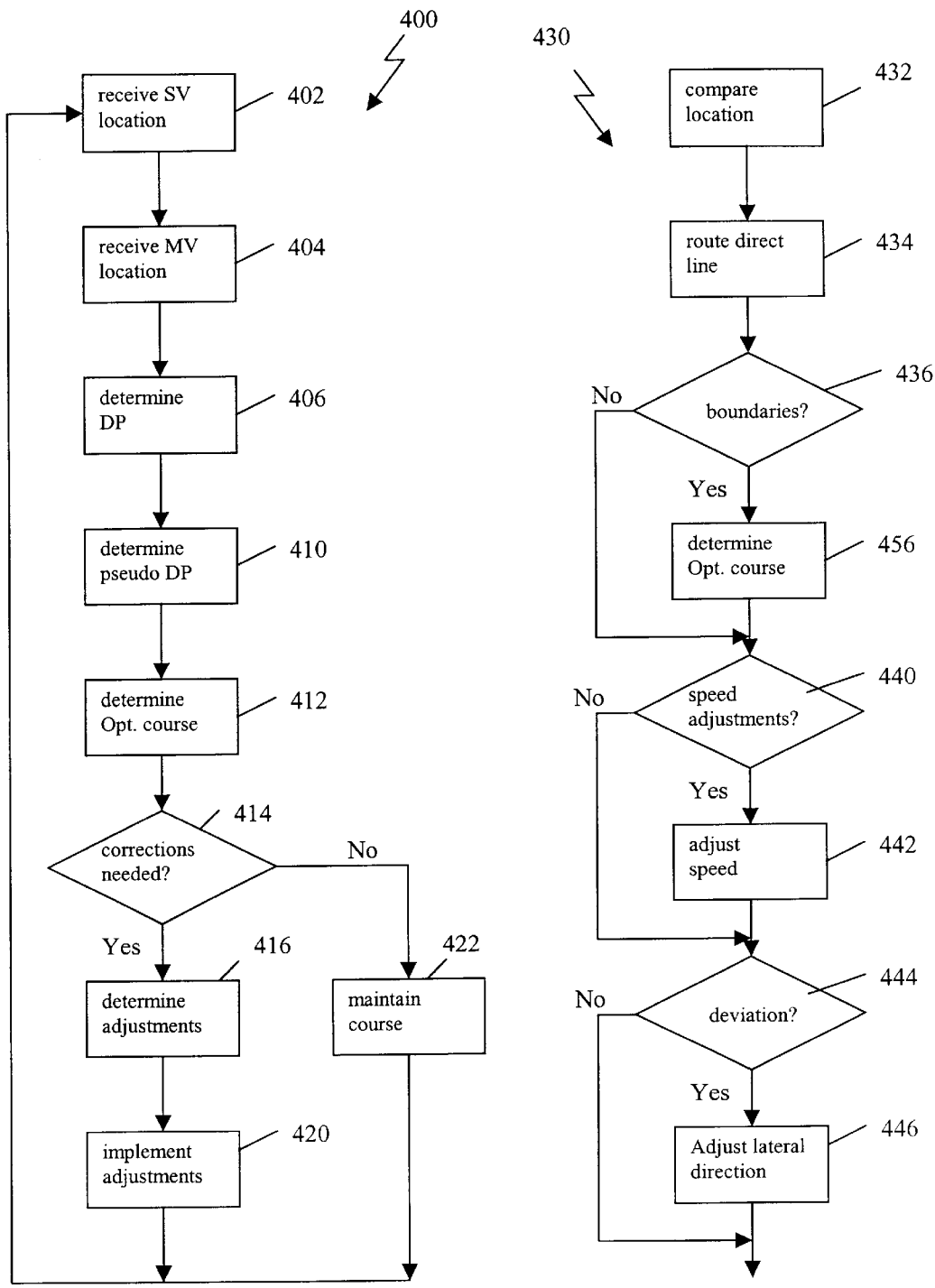
FIG. 10A shows a simplified flow diagram of one implementation of one embodiment of the control and navigational system operating in a slave vehicle under the DPA mode.
FIG. 10B shows a simplified flow diagram of one implementation of one embodiment of a slave vehicle operating under the DPA mode performing a step of the flow diagram shown in FIG. 10A in determining the optimal course.

FIG. 10A shows a simplified flow diagram of one implementation of one embodiment of the system 40 operating in a slave vehicle under the DPA mode 400. In step 402 the slave vehicle 224 receives its current location through the positioning system and location generator 90. In step 404 the slave vehicle receives the location of the master vehicle. In step 406 the slave vehicle determines the desired destination point 222 based on predefined parameters relative to the master vehicle location. In step 410, the slave vehicle determines the pseudo destination point 232. In step 412 the slave vehicle determines the optimal course in reaching the destination point. The optimal course is dependent on a variety of issues including current position, boundaries, speed, lateral errors based on the pseudo point and other limitations. In step 414 the slave vehicle determines if the optimal course is different than its current course. If the optimal course is different, the slave vehicle determines the adjustments needed to implement the optimal course in step 416. In step 420, the slave vehicle implements the adjustments needed through computer or other controls. If it is found in step 414 that the optimal course is the same as the current course, step 422 is entered where the course is maintained. The process 400 then returns from both steps 420 and 422 to step 402 to continue to acquire the destination point.

FIG. 10B shows a simplified flow diagram 430 of one implementation of one embodiment of a slave vehicle operating under the DPA mode 400 (FIG. 10A) performing step 412 in determining the optimal course. In step 432, the slave vehicle location is compared with the destination point. In step 434 the slave vehicle routes a direct line optimal path to acquire the destination point. In step 436 it is determined if there are any boundaries, such as other vehicles (including the master vehicle), rivers, roads that must be utilized. If there are boundaries, the slave vehicle determines the optimal course taking into account the boundaries in step 438. Step 440 follows step 438, and 436 if there are no boundaries in step 436. In step 440, the slave vehicle determines if the current speed of the slave vehicle, compared with the speed of the master vehicle will allow it to overtake the master vehicle to acquire the destination point 222. If not, in step 442, the slave vehicle adjusts its speed. In step 444, following both steps 440 and 442, the slave vehicle determines if there is a deviation from the current heading and the pseudo destination point 232. If there is a deviation, step 446 is entered where the slave vehicle adjusts its lateral direction. The process 428 then continues to step 434 of process 400 following both steps 444 if there is no deviation and step 446 once the lateral direction is adjusted.

Figure 11:
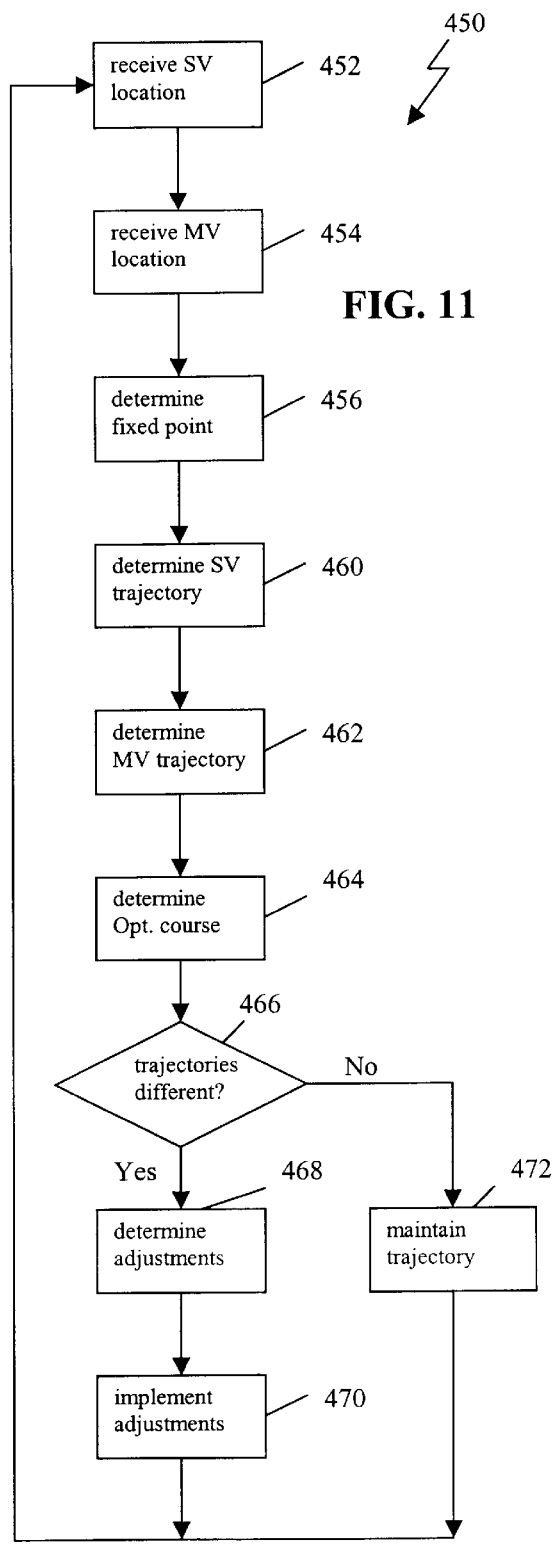
FIG. 11 shows a simplified flow diagram of one implementation of one embodiment of a slave vehicle operating under the TAF mode.

FIG. 11 shows a simplified flow diagram of one implementation of one embodiment of a slave vehicle operating under the TAF mode 450. In step 452 the slave vehicle 224 receives its own location. In step 454 the slave vehicle receives the master vehicles location and parameter information including parameters such as the master vehicle's steering angle, heading, speed and other such parameters. In step 456, the slave vehicle determines the fixed point based on the master vehicles location and the predefined coordinates defining the fixed point relative to the master vehicle. In step 460 the slave vehicle determines a current trajectory. In one embodiment, the slave vehicles trajectory is based on the current location of the slave vehicle, the location of the fixed point, the difference between the slave vehicles current location and the fixed point, the current steering angle of the master vehicle, and average of the master vehicle steering angle for a predefined period, the speed of the master vehicle, and other such parameters. In step 462, the slave vehicle determines the master vehicles trajectory based on similar parameters as utilized in step 460. In step 464 the slave vehicle determines the optimal course in reaching the destination point. The optimal course is dependent on a variety of issues including current position, boundaries, speed, lateral errors, slave and vehicle steering angles and average steering angles, and other limitations. In step 466 it is determined if the slave vehicle trajectory is different than the optimal trajectory. If the trajectories are different, step 468 is entered where the slave vehicle determines steering commands to correct its trajectory to parallel the master vehicle trajectory. In step 470 the trajectory is assumed to go to infinity and the slave vehicle implements the trajectory through computers and control modules, such as steering and speed modules. If the trajectories match, step 472 is entered where the slave vehicle trajectory is maintained. Following steps 470 and 472, the process 450 returns to step 452 to receive the slave vehicle location.

Figure 12:
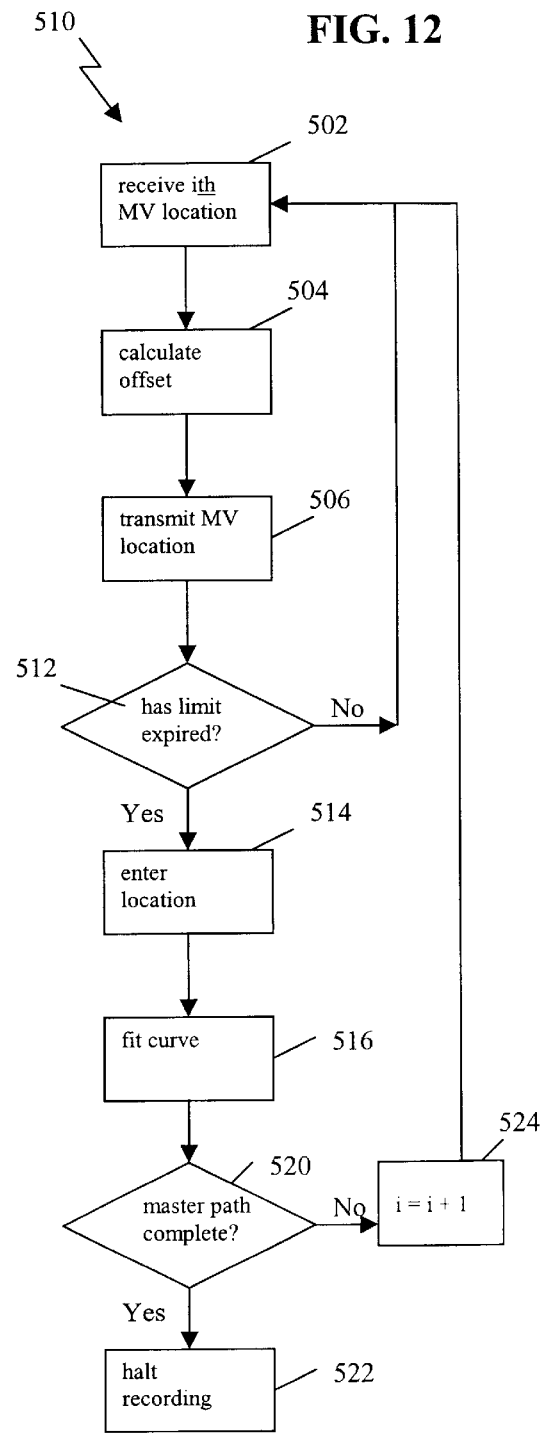
FIG. 12 shows a simplified flow diagram of one implementation of one embodiment of a master vehicle generating a master path to allow a slave vehicle to operate under the PT mode.

FIG. 12 shows a simplified flow diagram of one implementation of one embodiment of a master vehicle generating a master path 500 to allow a slave vehicle to operate under the PT mode. In step 502 the master vehicle receives its current location from the positioning system and records the location as the $i^{th}$ location. In step 504, and calculates an offset value used to determine the location of the desired destination point 222 or some other offset, such as a slave path 272 for the master vehicle to follow after an initial master path has been generated. In step 506 the $i^{th}$ location is transmitted to slave vehicles or an external computer or storage component for storing. In step 512 it is determined if a predefined limit, such as a time limit or a distance limit, has expired. If the limit has not been reach the process cycles through step 512 until the limit is reached. If the limit has been reached, the $i^{th}$ location is entered into a trajectory and the trajectory is stored in step 514. In step 516 a the curve is fit through the plurality of points forming the path of the master vehicle to further form the trajectory of the master vehicle and smooth out the path and trajectory. Step 520 is then entered to determine if the master vehicle has completed the generation of the master path. If the master path is complete, step 522 is entered where recording of the master path is halted. If the master path is not complete, step 524 is entered where "i" is incremented such that i=i+1. The process 510 then returns to step 512 to again record the master vehicles location.

Figure 13:
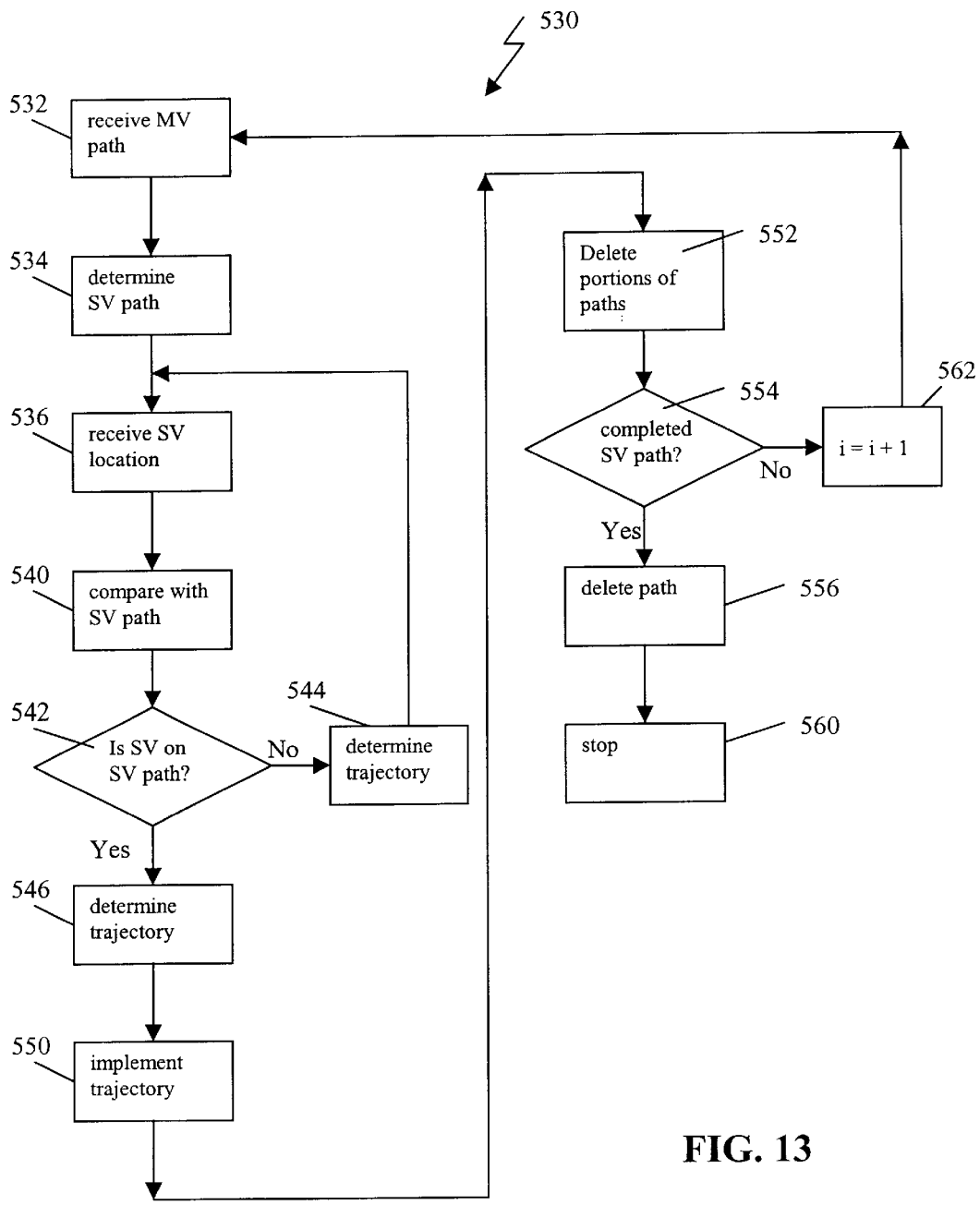
FIG. 13 shows a simplified flow diagram of one implementation of one embodiment of a slave vehicle operating under the PT mode.

FIG. 13 shows a simplified flow diagram of one implementation of one embodiment of a slave vehicle operating under the PT mode 530. In step 532 the slave vehicle receives at least a portion of the master path, including an $i^{th}$ location. In step 534, the slave vehicle determines the slave path based on a predefined offset and the master path. In step 536, the slave vehicle receives its current location. In step 540 the current location is compared with the slave path. In one embodiment, the master and slave paths are continuous paths such that in comparing the current location with the slave path the slave vehicle, in one embodiment, determines the closest point on the slave path to the current location and designates that as the $i^{th}$ location. In step 542 the slave vehicle determines if the current location is substantially the same as the $i^{th}$ location. If the current location is not equal to the $i^{th}$ location on the slave path, step 544 is entered where the slave vehicle determines and implements a trajectory which will return the slave vehicle to the slave path. The process 530 then returns to step 536 to receive the slave vehicles current location to again determine if the slave vehicle is on the slave path. If the slave vehicle location equals the slave path at the $i^{th}$ location in step 542, step 546 is entered where the slave vehicle trajectory is determined based on the slave vehicle current location, slave path, and other parameters. In one embodiment, the trajectory is determined by utilizing at least the $i^{th}$ location and the i+1 location of the slave path. In step 550, the slave vehicle implements the trajectory determined in step 546. In step 552, the slave vehicle deletes portions of the master and slave paths already utilized in determining the trajectory to reduce memory requirements. In step 554, the process 530 determines if the slave vehicle has completed the slave path. If yes, step 556 is entered where the $i^{th}$ location of both the master and slave paths are deleted from memory and in step 560 the slave vehicle is stopped. If it is determined that the slave vehicle has not completed the slave path in step 554, "i" is incremented, such that i=i+1, in step 562. The process 530 then returns to step 532 to receive additional portions of the master path if necessary. If all of the master path has been received the process proceeds to step 534 for determining the slave path.

Regardless of the mode of operation, the master vehicle is not burdened by the slave vehicles and is not limited by the slave vehicles. The master vehicle is not required to generate control and trajectory for the slave vehicles. The slave vehicles provide their own control thus substantially any number of slave vehicles can be operated from the master vehicle. The inventive method and apparatus provides for the control of slave vehicles to allow turns during operation while still maintaining a desired course or destination. Further, the control system allows a slave vehicles to be positioned at any position relative to the master vehicle. The slave vehicles are not restricted to a single direction at a parallel path, or being directly behind the master vehicle. The slave vehicles can be positioned at substantially any location relative to the master vehicle, left, right, in front of, behind, and combinations thereof, and can follow evolving curves making turns associated with the turns of the master vehicle.

The present control and navigational method and apparatus allows the master vehicle to travel any desired course. The master vehicle is not required to operate off of a predefined course. The slave vehicles operate off of the master vehicle thus avoiding the need to determine and plot out a predefined path, thus saving time, providing greater accuracy in performance of the desired task, and allowing greater flexibility in performing the desired task.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. Having described the best mode, it is intended that the scope of the invention be defined by the claims appended hereto and their equivalents.

What is claimed is:

1. A method for providing navigation for at least a first slave vehicle, wherein the first slave vehicle navigates based on a location of a master vehicle, the method comprising the steps of:
   a first slave vehicle:
      receiving a location of a master vehicle;
      receiving a location of the first slave vehicle;
      determining a desired position of the first slave vehicle based on the master vehicle location including determining a first destination point relative to the location of the master vehicle;
      determining a first optimal course needed to position the first slave vehicle at the first destination point; and
      determining adjustments including determining the adjustments to implement the first optimal course
      determining if adjustments are needed to position the first slave vehicle at the desired position; and
   implementing the adjustments if adjustments are needed.

2. The method as claimed in claim 1, further comprising the step of:
   determining if the first optimal course is different than a current first slave vehicle course; and
   the step of determining if adjustments are needed including determining the adjustments to be made to the current first slave vehicle course to implement the first optimal course.

3. The method as claimed in claim 2, further comprising the step of:
   determining a first pseudo destination point based on the location of the master vehicle; and
   the step of determining the first optimal course including utilizing the first pseudo destination point in determining at least lateral adjustments.

4. The method as claimed in claim 1, wherein:
   the step of receiving the location of the master vehicle including receiving the location of the master vehicle at least periodically;
   the step of receiving the location of the first slave vehicle including receiving the location of the first slave vehicle at least periodically; and
   the step of determining the first optimal course including redetermining the first optimal course each time the first slave vehicle receives one of the periodic locations of the master vehicle.

5. The method as claimed in claim 4, wherein:
   the step of receiving the location of the master vehicle including continuously receiving the location of the master vehicle; and
   the step of determining the first optimal course including continuously adjusting the first optimal course based on the location of the master vehicle and the location of the first slave vehicle.

6. The method as claimed in claim 1, further comprising the steps of:
   a second slave vehicle:
      receiving the location of the master vehicle;
      determining a second destination point relative to the location of the master vehicle;
      receiving a location of the second slave vehicle;
      determining a second optimal course needed to position the second slave vehicle at the second destination point; and
      making adjustments to implement the second optimal course if adjustments are needed.

7. The method as claimed in claim 1, further comprising the steps of:
   a second slave vehicle:
      receiving the location of the first slave vehicle;
      receiving a location of the second slave vehicle;
      determining a desired position of the second slave vehicle based on the first slave vehicle location;
      determining if adjustments are needed to position the second slave vehicle at the desired position; and
      implementing the adjustments if adjustments are needed.

8. The method as claimed in claim 7, further comprising the steps of:
   the step of determining the desired position including determining a second destination point relative to the location of the first slave vehicle;
   the step of determining if adjustments are needed including determining a second optimal course needed to position the second slave vehicle at the second destination point; and
   making adjustments to implement the second optimal course if adjustments are needed.

9. A computer program product for providing application processing, the computer program product including a computer readable storage medium and a computer program mechanism embedded therein, the computer program mechanism comprising:
   a method for providing vehicle navigation as in claim 1.

10. A method for providing navigation for at least a first slave vehicle, wherein the first slave vehicle navigates based on a location of a master vehicle, the method comprising the steps of:

a first slave vehicle:
- receiving a location of a master vehicle;
- receiving a location of the first slave vehicle;
- determining a desired position of the first slave vehicle based on the master vehicle location including determining a first fixed point relative to the master vehicle location;
- determining if adjustments are needed to position the first slave vehicle at the desired position including determining if the first slave vehicle is located at the first fixed point; and
- implementing the adjustments if adjustments are needed.

11. The method as claimed in claim 10, further comprising the steps of:
- determining a trajectory of the master vehicle;
- determining a trajectory of the first slave vehicle; and
- the step of determining if adjustments are needed including determining if the trajectory of the first slave vehicle is parallel with the trajectory of the master vehicle.

12. The method as claimed in claim 11, further comprising the step of:
- receiving control parameters from the master vehicle, wherein the control parameters include adjustments to the master vehicle affecting the trajectory of the master vehicle; and
- the step of determining a trajectory of the master vehicle including utilizing the control parameters.

13. The method as claimed in claim 12, wherein:
the control parameters including steering commands.

14. The method as claimed in claim 12, wherein:
the step of implementing adjustments such that the first slave vehicle maintains a position at the fixed position even while the master vehicle implements turns.

15. The method as claimed in claim 10, further comprising:
a second vehicle:
- receiving the location of the master vehicle;
- receiving a location of the second slave vehicle;
- determining a desired position of the second slave vehicle based on the master vehicle location including:
  - determining a second fixed point relative to the master vehicle location;
  - determining a trajectory of the master vehicle;
  - determining a trajectory of the second slave vehicle;
  - determining if adjustments are needed to position the second slave vehicle at the second fixed point including determining if the trajectory of the second slave vehicle is parallel with the trajectory of the master vehicle; and
  - implementing the adjustments if adjustments are needed.

16. The method as claimed in claim 10, further comprising:
a second vehicle:
- receiving the location of the first vehicle;
- receiving a location of the second slave vehicle;
- determining a desired position of the second slave vehicle based on the first slave vehicle location including:
  - determining a second fixed point relative to the first slave vehicle location;
  - determining a trajectory of the first slave vehicle;
  - determining a trajectory of the second slave vehicle;
  - determining if adjustments are needed to position the second slave vehicle at the second fixed point including determining if the trajectory of the second slave vehicle is parallel with the trajectory of the first slave vehicle; and
  - implementing the adjustments if adjustments are needed.

17. A computer progam product for providing application processing, the computer program product including a computer readable storage medium and a computer program mechanism embedded therein, the computer program mechanism comprising:
a method for providing vehicle navigation as in claim 10.

18. A method for providing navigation for at least a first slave vehicle, wherein the first slave vehicle navigates based on a location of a master vehicle, the method comprising the steps of:
a first slave vehicle:
- receiving a location of a master vehicle;
- receiving a location of the first slave vehicle;
- determining a desired position of the first slave vehicle based on the master vehicle location including
  - receiving at least a first portion of a master vehicle path;
  - receiving at least a first portion of a master vehicle path;
  - generating at least a first portion of a first slave vehicle path based on the at least the first portion of the master vehicle path;
  - determining if adjustments are needed in maintaining the first slave vehicle on the first slave vehicle path;
- determining if adjustments are needed in maintaining the first slave vehicle on the first slave vehicle path and/or to position the first slave vehicle at the desired position; and
- implementing the adjustments if adjustments are needed.

19. The method as claimed in claim 18, wherein:
the step of generating at least the first portion of the first slave vehicle path including generating the at least the first portion of the first slave vehicle path by offsetting the at least the first portion of the master vehicle path by an offset.

20. The method as claimed in claim 19, wherein:
the step of determining if adjustments are needed including comparing the location of the first slave vehicle with the first slave vehicle path;
determining if the first slave vehicle is off of the first slave vehicle path; and
determining a trajectory to return the first slave vehicle to the first slave vehicle path if the first slave vehicle is off of the first slave vehicle path.

21. The method as claimed in claim 19, wherein:
the step of determining if any adjustments are needed including comparing the location of the first slave vehicle with the first slave vehicle path; and
the step of determining adjustments including determining what steering adjustments are needed to make turns to follow the first slave path.

22. The method as claimed in claim 21, wherein:
the step of determining adjustments including calculating the distance between the location of the first slave vehicle and approaching adjustments to a current trajectory of the first slave vehicle to continue on the first slave vehicle path.

23. The method as claimed in claim 19, further comprising the steps of:
receiving at least a second portion of the master path; and
generating at least a second portion of the first slave vehicle path.

24. The method as claimed in claim 18, wherein:
the first slave vehicle is the master slave vehicle.

25. The method as claimed in claim 18, further comprising the steps of:
a second slave vehicle:
receiving at least the first portion of the master vehicle path;
generating at least a first portion of a second slave vehicle path based on the at least the first portion of the master vehicle path;
receiving a location of the second slave vehicle;
determining if adjustments are needed in maintaining the second slave vehicle on the second slave vehicle path; and
implementing the adjustments if adjustments are needed.

26. The method as claimed in claim 25, wherein:
the first and second slave vehicles are both different vehicles than the master vehicle.

27. The method as claimed in claim 25, wherein:
at least one of the first and second slave vehicles is the master vehicle.

28. The method as claimed in claim 18, further comprising the steps of:
a second slave vehicle:
receiving at least the first portion of the first slave vehicle path;
generating at least a first portion of a second slave vehicle path based on the at least the first portion of the first slave vehicle path received;
receiving a location of the second slave vehicle;
determining if adjustments are needed in maintaining the second slave vehicle on the second slave vehicle path;
implementing the adjustments if adjustments are needed.

29. A method for vehicle navigation, comprising the steps of:
a first slave vehicle:
receiving a location of a master vehicle;
receiving a location of the first slave vehicle, including receiving at least a portion of master vehicle path;
determining a desired location of the first slave vehicle, including
determining at least a portion of a first slave path relative to the at least the portion of the master vehicle path, wherein the desired location is relative to the master vehicle location and wherein the first slave path is offset from the master vehicle path;
determining adjustments to be made by the first slave vehicle to reach the desired location; and
implementing the adjustments.

30. The method as claimed in claim 29, further comprising the steps of:
a second slave vehicle determining at least a portion of a second slave path based on the at least the portion of the first slave path; and
the second slave vehicle following the second slave path.

31. A method for vehicle navigation, comprising the steps of:
a first slave vehicle;
receiving a location of a master vehicle;
receiving a location of the first slave vehicle;
determining a desired location of the first slave vehicle, including
determining a first slave vehicle desired destination point offset from the location of the master vehicle, wherein the desired location is relative to the master vehicle location;
determining adjustments to be made by the first slave vehicle to reach the desired location; and
implementing the adjustments.

32. The method as claimed in claim 31, further comprising the steps of:
the step of determining adjustments including determining an optimal course in which to acquire the first vehicle desired destination point.

33. The method as claimed in claim 32, wherein:
the step of determining the optimal course wherein the optimal course is not limited to the master vehicle course.

34. The method as claimed in claim 32, wherein:
the step of determining the optimal course including adjusting the optimal course based on boundaries.

35. The method as claimed in claim 31, wherein:
the step of determining adjustments including utilizing a pseudo destination point for at least determining adjustments for lateral control.

36. A method for vehicle navigation, comprising the steps of:
a first slave vehicle:
receiving a location of a master vehicle;
receiving a location of the first slave vehicle;
receiving first offset coordinates;
determining a desired location of the first slave vehicle, including
determining a first fixed point based on the location of the master vehicle and the first offset coordinates, wherein the desired location is relative to the master vehicle location;
determining adjustments to be made by the first slave vehicle to reach the desired location; and
implementing the adjustments.

37. The method as claimed in claim 36, further comprising the steps of:
receiving master vehicle parameters;
the step of determining adjustments including determining a trajectory of the master vehicle;
determining a trajectory of the first slave vehicle; and
determining the adjustments such that the trajectory of the first slave vehicle is in parallel with the trajectory of the master vehicle.

38. The method as claimed in claim 37, wherein:
the step of determining the trajectory of the first slave vehicle including determining a heading of the first slave vehicle and extending a trajectory from the location of the first slave vehicle to infinity along the heading.

39. A computer program product for providing application processing, the computer program product including a computer readable storage medium and a computer program mechanism embedded therein, the computer program mechanism comprising:
a method for providing vehicle navigation as in claim 36.

40. A method for vehicle navigation, comprising the steps of:
- a first slave vehicle:
  - receiving a location of a master vehicle;
  - receiving a location of the first slave vehicle;
  - receiving first offset coordinates;
    - determining a desired location of the first slave vehicle, including
    - determining a first fixed point based on the location of the master vehicle and the first offset coordinates, wherein the desired location is relative to the master vehicle location;
    - determining adjustments to be made by the first slave vehicle to reach the desired location;
    - implementing the adjustments; and
- a second slave vehicle:
  - receiving second offset coordinates;
  - receiving the location of the master vehicle;
  - receiving a location of the second slave vehicle;
  - determining a desired location of the second slave vehicle, wherein the desired location is relative to the master vehicle location;
  - determining adjustments to be made by the second slave vehicle to position the second slave vehicle at the desired location; and
  - implementing the adjustments.

41. A computer program product for providing application processing, the computer program product including a computer readable storage medium and a computer program mechanism embedded therein, the computer program mechanism comprising:
- a method for providing vehicle navigation as in claim 40.

42. A first slave vehicle including an apparatus for navigating the first slave vehicle, comprising:
- a means for receiving a location of a master vehicle and a location of a first slave vehicle;
- a means for determining a desired position of the first slave vehicle based on the master vehicle location where the means for determining the desired position couples with the means for receiving, the means for determining a desired position including a means for determining a desired destination point relative to the master vehicle location;
- a means for determining if adjustments are needed to position the first slave vehicle at the desired position couples with the means for determining the desired position and the means for receiving the location of the slave vehicle, the means for determining if adjustments are needed including a means for determining an optimal course to acquire the desired destination point, wherein the optimal course is not limited to a master vehicle course; and
- a means for implementing the adjustments if adjustments are needed coupled with the means for determining if adjustments are needed.

43. The apparatus as claimed in claim 42, wherein:
- the means for determining the desired position including a means for determining a fixed point relative to the master vehicle;
- the means for determining if adjustments are needed including a means for determining a trajectory of the master vehicle and a trajectory of the slave vehicle; and
- the means for implementing the adjustments including a means for maintaining the trajectory of the slave vehicle in parallel with the trajectory of the master vehicle.

44. A first slave vehicle including an apparatus for navigating the first slave vehicle, comprising:
- a means for receiving a location of a master vehicle and a location of a first slave vehicle;
- a means for determining a desired position of the first slave vehicle based on the master vehicle location where the means for determining the desired position couples with the means for receiving, the means for determining the desired position including a means for determining a master vehicle path coupled with a means for determining a first slave vehicle path;
- a means for determining if adjustments are needed to position the first slave vehicle at the desired position couples with the means for determining the desired position and the means for receiving the location of the slave vehicle, the means for determining if adjustments are needed including a means for comparing the slave vehicle location with the slave vehicle path coupled with both the means for receiving the location of the slave vehicle and the means for determining the slave vehicle path; and
- a means for implementing the adjustments if adjustments are needed coupled with the means for determining of adjustments are needed.

45. An apparatus for providing vehicle navigation, comprising:
- a communication controller configured to at least receive location information for at least a master vehicle and a slave vehicle;
- a location generator coupled with the communication controller, and configured to determine locations of at least the master vehicle relative to the position of the slave vehicle; and
- a trajectory controller configured to control the trajectory of the slave vehicle coupled with the location generator, and configured to determine a desired location of the slave vehicle relative to the location information of both the master vehicle and the slave vehicle and further including a destination point calculator configured to determine a desired destination point relative to the master vehicle.

46. The apparatus as claimed in claim 45, further comprising:
- a course calculator coupled with the destination point calculator, and configured to determine an optimal course such that the slave vehicle acquires the desired destination point.

47. The apparatus as claimed in claim 45, wherein:
- the trajectory controller is a path controller configured to generate at least a slave vehicle path such that the slave vehicle follows the slave path.

48. The computer readable medium containing instructions, which, when executed by a at least a first processor performs the following steps:
- a first slave vehicle:
  - receiving a location of a master vehicle;
  - receiving a location of the first slave vehicle;
  - determining a desired location of the first slave relative to the master vehicle location including determining a desired destination point;
    - determining adjustments to be made by the first slave vehicle such that the first slave vehicle positions itself at the desired location including determining an optimal course to acquire the desired destination point; and
    - implementing the adjustments.

49. A computer readable medium containing instructions, which, when executed by at least a first processor performs the following steps:
a first slave vehicle:
receiving a location of a master vehicle;
receiving a location of the first slave vehicle;
determining a desired location of the first slave vehicle relative to the master vehicle location including determining a fixed point relative to the location of the master vehicle;
determining adjustments to be made by the first slave vehicle such that the first slave vehicle positions itself at the desired location including determining a trajectory of both the master vehicle and the slave vehicle and further determining if the slave vehicle trajectory is parallel with the master vehicle trajectroy; and
implementing the adjustments.

50. The computer readable medium containing instructions, which, when executed by a at least a first processor performs the following steps:
a first slave vehicle:
receiving a location of a master vehicle including receiving at least a portion of a master vehicle path;
receiving a location of the first slave vehicle;
determining a desired location of the first slave vehicle relative to the master vehicle location including generating at least a portion of a slave vehicle path based on the at least a portion of the master vehicle path;
determining adjustments to be made by the first slave vehicle such that the first slave vehicle positions itself at the desired location including determining if the slave vehicle location is included within the slave vehicle path; and
implementing the adjustments.

51. A computer program product for providing application processing, the computer program including a computer readable storage medium and a computer program mechanism embedded therein, the computer mechanism comprising:
a method for providing vehicle navigation as in claim 18.

52. A computer program product for providing application processing, the computer program product including a computer readable storage medium and a computer program mechanism embedded therein, the computer program mechanism comprising:
a method for providing vehicle navigation as in claim 30.

53. A computer program product for providing application processing, the computer program product including a computer readable storage medium and a computer program mechanism embedded therein, the computer program mechanism comprising:
a method for providing vehicle navigation as in claim 32.

* * * * *